(12) United States Patent
Mochizuki

(10) Patent No.: US 7,027,201 B2
(45) Date of Patent: Apr. 11, 2006

(54) OPTICAL MODULATION ELEMENT AND PROJECTION APPARATUS

(75) Inventor: Noritaka Mochizuki, Kanagawa-ken (JP)

(73) Assignee: Canon Kabushiki Kaisha, Tokyo (JP)

( * ) Notice: Subject to any disclaimer, the term of this patent is extended or adjusted under 35 U.S.C. 154(b) by 199 days.

(21) Appl. No.: 09/841,282

(22) Filed: Apr. 24, 2001

(65) Prior Publication Data

US 2002/0001120 A1 Jan. 3, 2002

(30) Foreign Application Priority Data

Apr. 26, 2000 (JP) ........................................ 2000/125944

(51) Int. Cl.
*G02F 1/09* (2006.01)
*G02B 26/00* (2006.01)
*G02B 26/08* (2006.01)

(52) U.S. Cl. ...................... 359/291; 359/292; 359/298; 359/280

(58) Field of Classification Search ................ 359/280, 359/282, 290, 291, 292, 298
See application file for complete search history.

(56) References Cited

U.S. PATENT DOCUMENTS 5,490,009 A * 2/1996 Venkateswar et al. ...... 359/291
6,285,489 B1 * 9/2001 Helsel et al. ................ 359/291
6,438,282 B1 * 8/2002 Takeda et al. ............... 385/16
6,585,379 B1 * 7/2003 Yokoyama et al. ........... 353/31

FOREIGN PATENT DOCUMENTS

| JP | 2-254405 | 10/1990 |
| KR | 1999-008170 | 1/1999 |
| WO | WO97/31283 | 8/1997 |

OTHER PUBLICATIONS

Office Action from Korean Patent Office dated Nov. 23, 2002 (Japanese and Korean version).
Abstract for JPLO 2–254405 (English version).
Abstract for 1999–008170 (English version).

* cited by examiner

*Primary Examiner*—Tim Thompson
(74) *Attorney, Agent, or Firm*—Morgan & Finnegan, L.L.P.

(57) ABSTRACT

An optical modulation element is capable of forming a reflective diffraction grating in which heights of a plurality of elements each having a reflecting surface periodically change. The reflecting surfaces of at least one of the plurality of elements are driven in a direction of height by piezoelectric elements. The plurality of elements each having the surface as the reflecting surface are two-dimensionally arrayed by juxtaposing long sides. A rear surface side of an effective reflecting portion of each of the elements is fixed to the piezoelectric element.

11 Claims, 5 Drawing Sheets

OPTICAL MODULATION ELEMENT AND PROJECTION APPARATUS

BACKGROUND OF THE INVENTION

1. Field of the Invention

The present invention relate to an optical modulation element and a projection apparatus using the optical modulation element.

2. Related Background Art

Conventionally, a reflection diffraction grating type optical modulation element as shown in the perspective view of FIG. 3 has been proposed.

FIG. 3 shows a light modulator (optical modulation element) whose surface (reflecting surface) three-dimensionally deforms and has strip-shaped elements 31 each made of a thin film in a one-dimensional array on a substrate 30. Four strip-shaped elements 31 correspond to one picture element. The strip-shaped elements 31 are provided in a number corresponding to the picture elements in the horizontal direction.

The substrate 30 can be formed using, e.g., silicon. A conductive layer 34 made of, e.g., tungsten or a tungsten alloy is formed on the substrate via a passivation layer (not shown) made of, e.g., silicon nitride ($Si_3N_4$). Each strip-shaped element 31 can be formed from, e.g., silicon nitride and has its two ends fixed on the substrate 30 at positions separated from conductive layer 34. An intermediate flat portion 32 is spaced apart from the substrate 30 while forming a gap 33. The upper surface of the flat portion 32 is coated with a light reflecting material such as an aluminum film.

The thickness of the gap 33 can be adjusted by changing the magnitude of a voltage to be impressed between the strip-shaped element 31 and the conductive layer 34. When no voltage is impressed, the strip-shaped element 31 projects, as shown in FIG. 4A. When an appropriate voltage is impressed between the strip-shaped element 31 and the conductive layer 34, the strip-shaped element 31 deforms due to electrostatic attraction, so the flat portion 32 of the strip-shaped element 31 bends toward the substrate 30 and comes into contact with the substrate 30, as shown in FIG. 4B.

Assume that all strip-shaped elements 31 project, as shown in FIG. 4A. When light having a wavelength $\lambda$ becomes perpendicularly incident on the surface of the substrate 30, all reflected light components from the element flat portions 32 of the strip-shaped elements 31 are in phase, and four elements 31 which form one picture element functions as a flat mirror.

Assume that four strip-shaped elements 31 alternately exhibit projecting and recessed shapes, and for example, the height difference between the projecting portion and the recessed portion is $\lambda/4$. When light having the wavelength $\lambda$ becomes perpendicularly incident on the surface of the substrate 30, the phase of reflected light from each protecting portion surface is shifted from that of reflected light from each recessed portion surface by $\lambda/2$, as shown in FIG. 6. Interference occurs between these reflected light components, so the reflected light emerges from the surface as reflected diffraction light having an angle $\theta$ with respect to a line perpendicular to the surface.

Hence, for example, when a lens for focusing light reflected at the angle $\theta$ is arranged, an arbitrary one of the plurality of picture elements can be displayed as a dark picture element by modulating four strip-shaped elements 31 corresponding to that picture element to the state shown in FIG. 5, and an arbitrary one of the plurality of picture elements can be displayed as a bright picture element upon receiving light by modulating four strip-shaped elements 31 corresponding to that picture element to the state shown in FIG. 6. FIG. 7 is a graph showing the impressed voltage vs. intensity of reflected light characteristic of a reflection diffraction grating having the above structure.

In the above prior art, however, a fixing portion 301 for supporting and fixing the effective reflecting portion 32 on the substrate 30 is necessary, as shown in FIG. 3 or 4A and 4B. Since the size of the fixing portion 301 is 20 μm or more, light incident on the fixing portion 301 causes flare. Additionally, in the above prior art, since the strip-shaped elements cannot be made compact in the longitudinal direction, the two-dimensional array of elements reduces the aperture ratio of the picture elements.

SUMMARY OF THE INVENTION

It is an object of the present invention to provide an optical modulation element and a projection apparatus using the optical modulation element, which can eliminate or reduce flare.

The present invention discloses the following arrangements (1) to (10).

(1) An optical modulation element capable of forming a reflective diffraction grating in which heights of a plurality of elements each having a reflecting surface periodically change, wherein the reflecting surfaces of at least one of the plurality of elements are driven in a direction of height by piezoelectric element.

(2) In the optical modulation element according to (1), the plurality of elements each having the reflecting surface are two-dimensionally arrayed by juxtaposing long sides.

(3) In the optical modulation element according to (1) or (2), said plurality of elements are respectively provided with the piezoelectric elements the polarities of electric fields of which are alternately different from each other.

(4) In the optical modulation element according to (3), a rear surface side of an effective reflecting portion of each of the elements is fixed to the piezoelectric element.

(5) In the optical modulation element according to (3) or (4), a deformation amount of a projecting and/or recessed shape of each element is changed by adjusting a voltage to be impressed to the piezoelectric element, thereby controlling an intensity of reflected light.

(6) In the optical modulation element according to any one of (1) to (4), when the reflecting surfaces of the plurality of elements are substantially flush with each other, said reflecting surfaces act as a flat mirror as a whole.

(7) In the optical modulation element according to any one of (1) to (6), each of the elements is a strip-shaped element having a width of about 5 μm.

(8) In the optical modulation element according to any one of (1) to (7), an interval between adjacent elements is minimized as much as possible.

(9) In the optical modulation element according to claim any one of (1) to (8), pixels each formed from the plurality of elements are arranged in a two-dimensional array.

(10) A projection apparatus including an optical modulation element for modulating incident light in accordance with a video signal, wherein the optical modulation element is formed from the optical modulation element of any one of (1) to (9).

In the embodiment to be described below, the fixing portion 301 as in the prior art can be omitted by applying the above arrangements, so the flare can be prevented. In addition, even when picture elements are arranged in a two-dimensional array, the aperture ratio can be made high.

BRIEF DESCRIPTION OF THE DRAWINGS

FIGS. 4A and 4B are views for explaining the function of the conventional optical modulation element, In which FIG. 4A is a view for explaining an unimpressed state, and FIG. 4B is a view for explaining an impressed state;

DETAILED DESCRIPTION OF THE PREFERRED EMBODIMENTS

The embodiment of the present invention will be described below.

Figure 1:
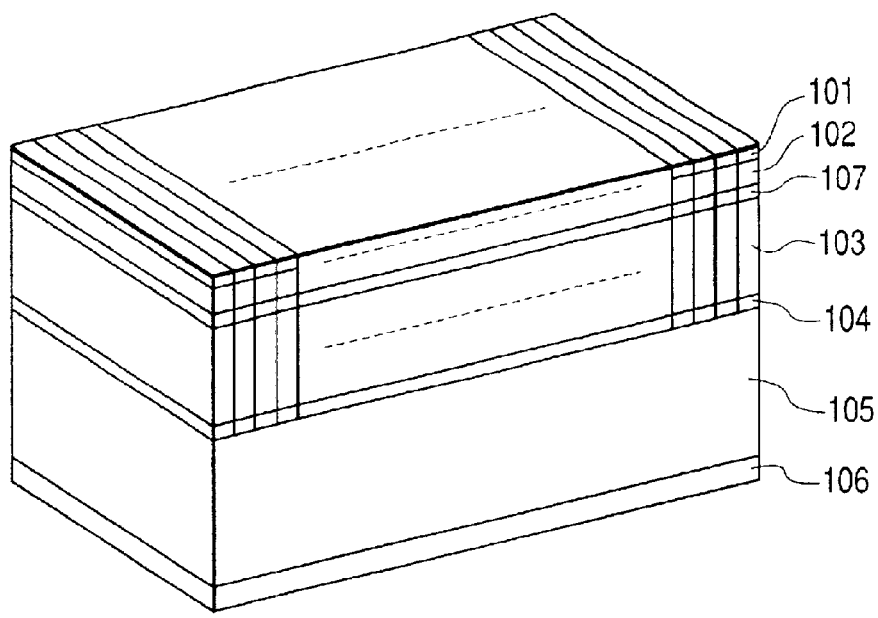
FIG. 1 is a perspective view showing the structure of an optical modulation element according to the embodiment of the present invention.

FIG. 1 is a perspective view showing the structure of an optical modulation element according to the embodiment of the present invention, which can form a reflective diffraction grating.

Referring to FIG. 1, the optical modulation element comprises aluminum portions 101 each serving as a mirror that forms an effective reflecting portion, metal members 102, metal electrodes 107, piezoelectric materials 103, metal electrodes 104, a support member 105, and a substrate 106.

In this embodiment, charges are applied to the piezoelectric material inserted between the metal electrodes 104 and 107 to expand/contract the piezoelectric material, thereby causing the above-described change in the gaps between adjacent effective reflecting portions.

That is, when the piezoelectric material 103 is charged, and the polarity of the electric field matches that of the piezoelectric material, the material contracts. If the polarity of the electric field is opposite to that of the piezoelectric material, the material expands. Hence, the plurality of mirror portions 101 move upward/downward upon charging to alternately change their heights, so that a reflection type diffraction grating or a mere flat mirror can appear. The degree of modulation of reflected light by the diffraction grating can be adjusted by changing the height of the recessed or projecting portion of the reflection type diffraction grating to change the phase difference between adjacent light components.

As shown in FIG. 1, since the mirror 101 itself that forms the effective reflecting portion is fixed on the substrate through the driving portion, no wasteful fixed portion need be prepared, unlike the prior art. Hence, an optical modulation element capable of obtaining a high aperture ratio even In use of a two-dimensional array and eliminating flare can be formed.

Figure 2:
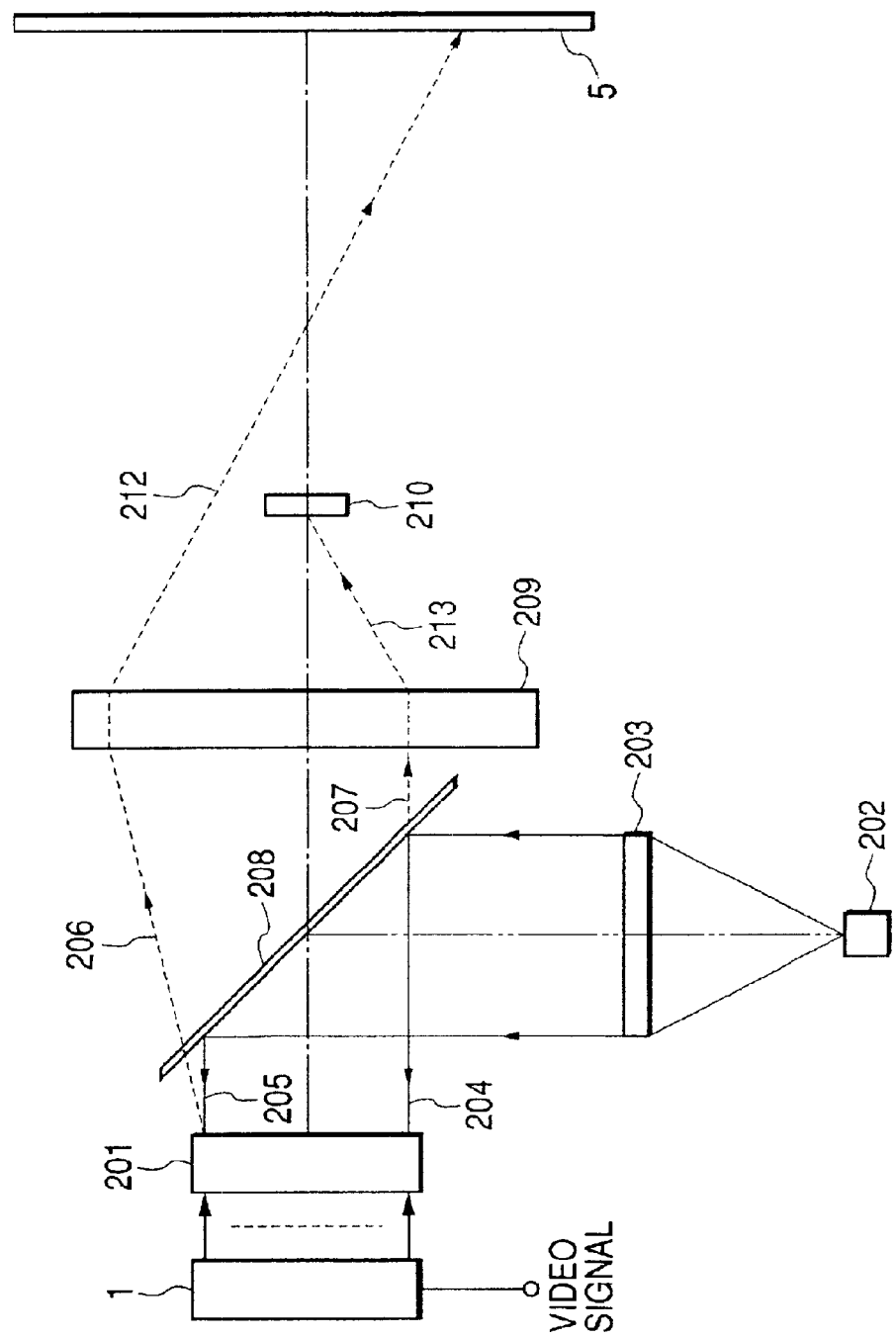
FIG. 2 is a view showing the arrangement of a projection apparatus using the element according to the embodiment.
Figure 3:
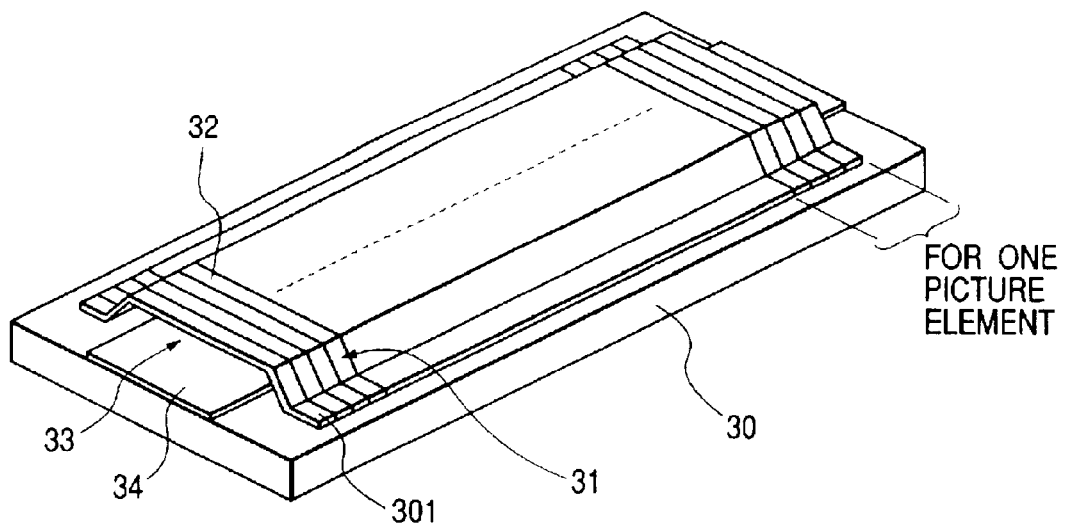
FIG. 3 is a perspective view showing the structure of a conventional optical modulation element.
Figure 4A:
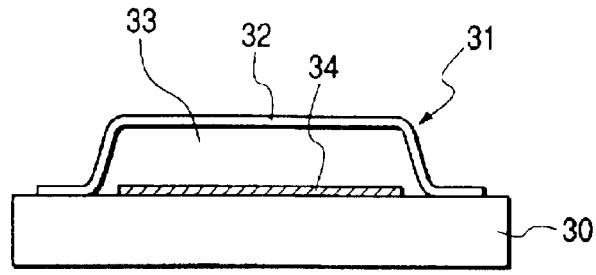
Figure 4B:
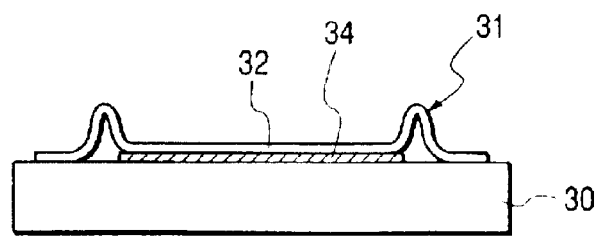

FIG. 2 is a view showing the arrangement of a projection apparatus using the element according to this embodiment.

Referring to FIG. 2, the projection apparatus comprises an optical modulation element 201 that can form a reflective diffraction grating, a light source 202, lens 203, half mirror 208, projection lens 209, and stopper 210.

Light emitted from the light source 202 is converted into parallel light by the lens 203, reflected by the half mirror 208, and enters the optical modulation element 201.

On the other hand, a modulation signal (voltage pulse) is applied from a driver 1 to each strip-shaped element of the optical modulation element 201 in accordance with a video signal to modulate each element in accordance with the luminance of a corresponding picture element in the horizontal direction (vertical direction in the drawing).

Figure 5:
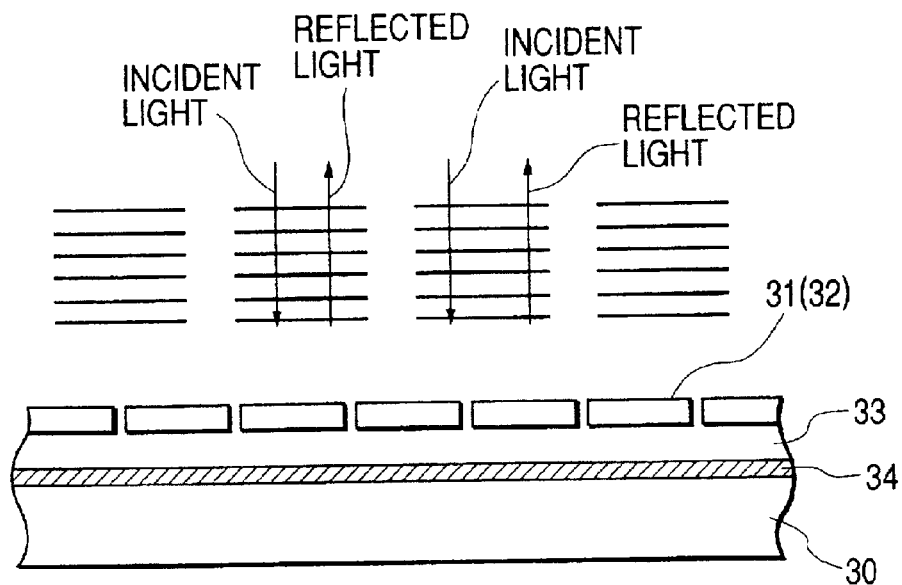
FIG. 5 is a view for explaining an unmodulated state of the strip-shaped elements of the optical modulation element.

When four strip-shaped elements corresponding to an arbitrary picture element are in the state (unmodulation state) shown in FIG. 5, the light propagates back along the optical path of incident light 204 without any diffraction, changes to a light beam 207 through the half mirror 208, is focused to the focal point of the projection lens 209 as a light beam 213, and absorbed by the stopper 210.

Figure 6:
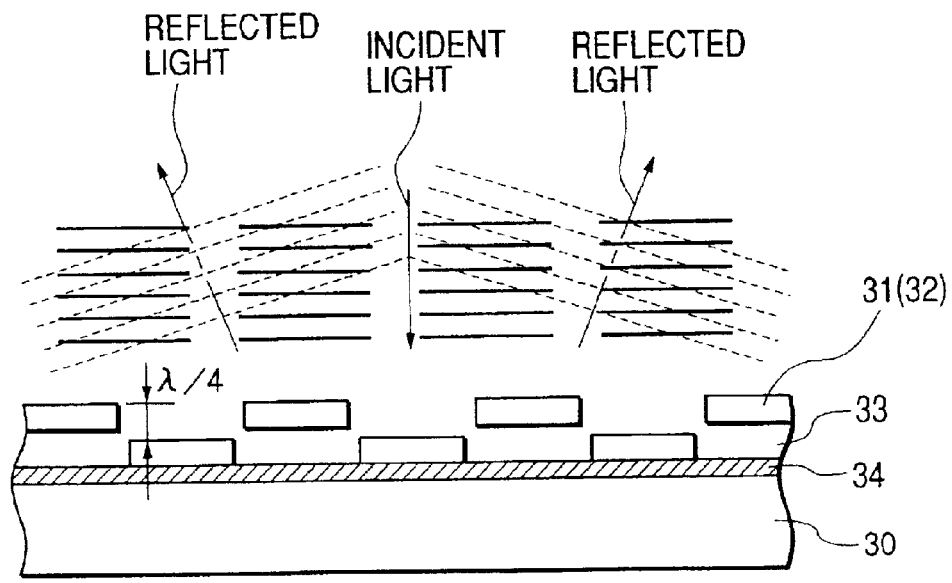
FIG. 6 is a view for explaining a modulated state of the strip-shaped elements of the optical modulation element.
Figure 7:
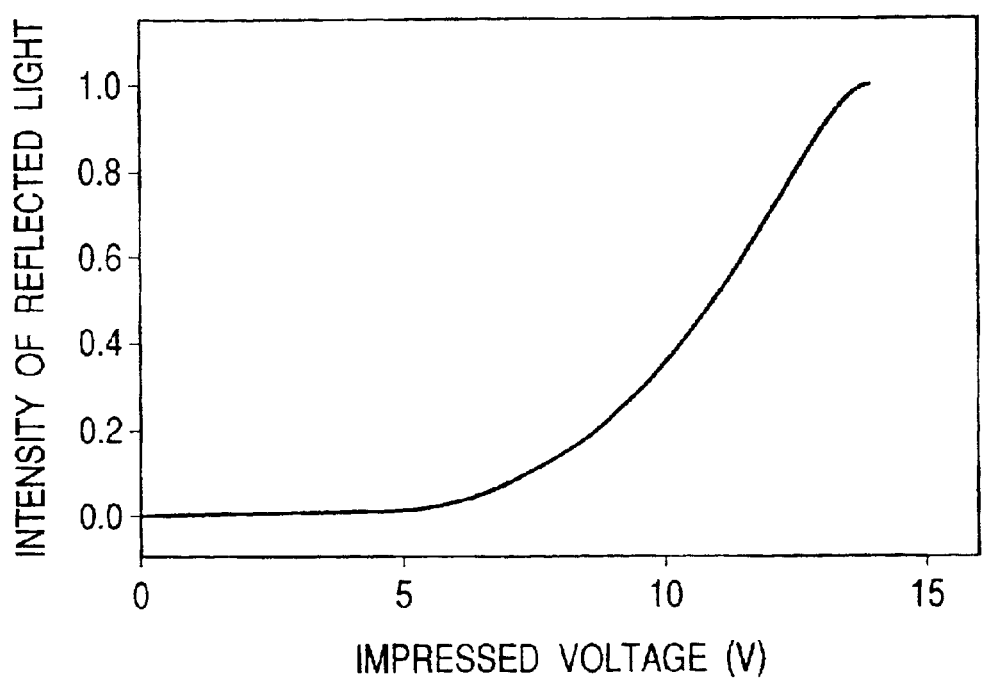
FIG. 7 is a graph showing the impressed voltage vs. intensity of reflected light characteristic of the optical modulation element.

When four strip-shaped elements corresponding to an arbitrary picture element are in the state (modulation state) shown in FIG. 6, the height of the grating 201 of the optical modulation element is $\lambda/4$, and diffraction occurs. The reflected light emerges in a direction different from that of incident light 205, changes to a light beam 206 through the half mirror 208, and changes to a light beam 212 through the projection lens 209, with which a predetermined horizontal line on a display plane 5 is irradiated through a galvanomirror (not shown). The galvanomirror is a scanner for scanning the incident light beam in a direction perpendicular to the horizontal line to display a desired image.

What is claimed is:

1. An optical modulation element capable of forming a reflective diffraction grating in which heights of a plurality of elements each having a reflecting surface periodically change, wherein the reflecting surface of at least one of the plurality of elements is supported by a piezoelectric element when driven in a direction of height by the piezoelectric element, wherein the plurality of elements are respectively provided with the piezoelectric element where the polarities of electric fields of which are alternately different from each other, and wherein a deformation amount of a projecting or recessed shape of each element is changed by adjusting a voltage to be impressed to the piezoelectric element, thereby controlling an intensity of light reflected and diffracted by said reflective diffraction grating.

2. An element according to claim 1, wherein the plurality of elements each having the reflecting surface are two-dimensionally arrayed by juxtaposing long sides.

3. An element according to claim 1, wherein a rear surface side of an effective reflecting portion of each of the elements is fixed to the piezoelectric element.

4. An element according to claim 1, wherein when the reflecting surfaces of the plurality of elements are substantially flush with each other, said reflecting surfaces act as a flat mirror as a whole.

5. An element according to claim 1, wherein each of the elements is a strip-shaped element having a width of about 5 µm.

6. A projection apparatus including an optical modulation element for modulating incident light in accordance with a video signal, wherein the optical modulation element is formed from said optical modulation element of claim 1.

7. An element according to claim 1, wherein pixels each formed from the plurality of elements are arranged in a two-dimensional array.

8. The projection apparatus comprising:

an optical modulation element that includes a plurality of reflecting surfaces and a plurality or piezoelectric elements configured to control the height of corresponding reflecting surfaces so that the reflecting surfaces form a reflective diffraction grating which generates diffraction light on the basis of incident light, wherein the intensity of light reflected and diffracted by said reflective diffraction grating is adjusted by adjusting a voltage to be impressed to the piezoelectric element;

a projection optical systemm for projecting light from said optical modulation element; and a stopper for shielding light reflected without being diffracted in said optical modulation element.

9. The projection apparatus according to claim 8, further comprising a stopper for shielding light reflected without being diffracted, wherein light diffracted in the optical modulation element is not applied to said stopper, but projected to a predetermined surface by said projection optical system.

10. An element according to claim 8, wherein said plurality of reflecting surfaces are capable of acting as a flat mirror under the control of said piezoelectric element.

11. An element according to claim 1, wherein said plurality of reflecting surfaces are capable of acting as a flat mirror under the control of said piezoelectric element.

* * * * *

UNITED STATES PATENT AND TRADEMARK OFFICE
CERTIFICATE OF CORRECTION

| | |
|---|---|
| PATENT NO. | : 7,027,201 B2 |
| APPLICATION NO. | : 09/841282 |
| DATED | : April 11, 2006 |
| INVENTOR(S) | : Mochizuki |

Page 1 of 1

It is certified that error appears in the above-identified patent and that said Letters Patent is hereby corrected as shown below:

In the Specification:

In col. 1, lines 58-59, please replace "protecting" with --projecting--.

In col. 3, line 17, please replace "element, In" with --element, in--.

In col. 3, line 66, please replace "even In" with --even in--.

In the Claim:

In claim 8 (col. 5, line 8), please replace "plurality or" with --plurality of--.

In claim 8 (col. 5, line 16), please replace "systemm" with --system--.

Signed and Sealed this

Third Day of April, 2007

JON W. DUDAS
*Director of the United States Patent and Trademark Office*